United States Patent [19]

Kroll

[11] Patent Number: 4,520,375

[45] Date of Patent: May 28, 1985

[54] FLUID JET EJECTOR

[75] Inventor: John W. Kroll, Greendale, Wis.

[73] Assignee: Eaton Corporation, Cleveland, Ohio

[21] Appl. No.: 494,246

[22] Filed: May 13, 1983

[51] Int. Cl.[3] .............................................. G01D 15/16

[52] U.S. Cl. ................................ 346/140 R; 310/309; 361/277; 417/410

[58] Field of Search .................... 346/140 R; 361/280, 361/277; 417/410, 321, 322; 318/116, 114; 310/308, 309

[56] References Cited

U.S. PATENT DOCUMENTS

| | | | |
|---|---|---|---|
| 2,975,307 | 3/1961 | Schroeder | 310/309 |
| 3,683,212 | 8/1972 | Zoltan | 346/140 X |
| 4,216,477 | 8/1980 | Matsuda | 346/140 |
| 4,453,169 | 6/1984 | Martner | 346/140 |

OTHER PUBLICATIONS

Byrnes, H. P.; Electrostatic Fluid Pump, IBM TDB, vol. 11, No. 4, Sep. 1968, p. 420.

Peterson, Kurt E., Silicon as a Mechanical Material; Proceedings of the IEEE, vol. 70, No. 5, May 1982, pp. 420–457.

*Primary Examiner*—Joseph W. Hartary

*Attorney, Agent, or Firm*—C. H. Grace; L. G. Vande Zande

[57] ABSTRACT

A fluid jet ejector, such as is used in an inkjet printer head, is provided by a pair of spaced capacitor plates, one of which is a thin diaphragm, preferably of semiconductor material, such as silicon. The capacitor plates may be photolithographically developed. Impressing a time varying voltage on the capacitor causes the diaphragm to be set into mechanical motion. A reservoir containing fluid, such as ink, is contiguous the diaphragm and has a nozzle through which fluid exits responsive to diaphragm motion.

13 Claims, 1 Drawing Figure

FLUID JET EJECTOR

BACKGROUND AND SUMMARY

The invention relates to fluid jet ejectors, including the type used in inkjet printer heads. Present inkjet printer heads employ piezoelectric devices as the driver element. The present invention affords an alternative to the piezoelectric element.

The present invention provides a fluid jet ejector comprising a pair of spaced capacitor plates, one of which is a thin diaphragm, responsive to a time varying voltage causing a varying electric field between the plates to set the diaphragm into mechanical motion as the driver element. In the preferred embodiment, the diaphragm is semiconductor material, such as silicon, and the set of capacitor plates may be photolithographically developed.

DETAILED DESCRIPTION

Figure 1:
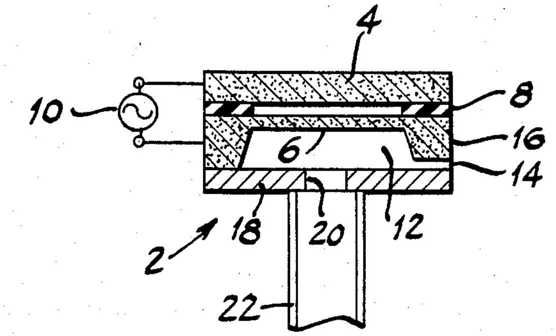
FIG. 1 is a schematic sectional view of a fluid jet ejector constructed in accordance with the invention.

FIG. 1 shows a fluid jet ejector 2, such as is used in an inkjet printer head, comprising a pair of capacitor plates 4 and 6 spaced by insulating means 8. Plate 6 is a thin diaphragm. The capacitor plates are responsive to a time varying voltage from source 10 causing a varying electric field between the plates to set diaphragm 6 into mechanical motion. A reservoir 12 contains fluid contiguous diaphragm 6, which fluid exits through nozzle 14 responsive to diaphragm motion.

In preferred form, diaphragm 6 is a thin section of semiconductor material, such as silicon. Reservoir 12 is on the side of diaphragm 6 opposite the other capacitor plate 4. The reservoir is formed by silicon side walls such as 16 extending integrally from diaphragm 6. In preferred form, capacitor plates 4 and 6 are photolithographically developed. Reservoir 12 is formed in a silicon substrate by a groove or cavity etched thereinto in accordance with standard processing techniques. An end wall 18 is provided facing and spaced from diaphragm 6 and engaging the ends of the side walls to close the cavity. End wall 18 has an entry port 20 therethrough from fluid source 22, which is an ink supply in the case of an inkjet printer head. Nozzle 14 is a passage along the interface of side wall 16 and end wall 18.

In the case of an inkjet printer head, voltage applied to capacitor plates 4 and 6 is varied to drive diaphragm 6 with a pulsating effect to form discrete ink drops in the ink stream exiting nozzle 14. Though the available driver element forces are low, the system requirements are also low, particularly when the voltage is varied to drive the diaphragm at its resonant frequency.

It is recognized that various modifications are possible within the scope of the appended claims.

I claim:

1. A fluid jet ejector comprising a pair of spaced capacitor plates, one of which is a thin diaphragm of semiconductor material, responsive to a time varying voltage causing a varying electric field between said plates to set said diaphragm into mechanical motion, and reservoir means containing fluid contiguous said diaphragm and including a nozzle through which fluid exits responsive to said diaphragm motion.

2. A fluid jet ejector comprising a pair of spaced capacitor plates, one of which is a thin diaphragm, responsive to a time varying voltage causing a varying electric field between said plates to set said diaphragm into mechanical motion, and a reservoir means containing fluid contiguous said diaphragm and including a nozzle through which fluid exits responsive to said diaphragm motion wherein said reservoir is on the side of said diaphragm opposite said other capacitor plate.

3. The invention according to claim 2 wherein said diaphragm is a thin section of semiconductor material, and wherein said reservoir is formed by side walls of said semiconductor material extending integrally from said diaphragm.

4. The invention according to claim 3 wherein said reservoir is formed in a semiconductor substrate by a groove or cavity etched thereinto.

5. The invention according to claim 3 comprising an end wall facing and spaced from said diaphragm and engaging the ends of said side walls to close said cavity, said end wall having a fluid source entry port therethrough.

6. The invention according to claim 5 wherein said nozzle comprises a passage along the interface of said side wall and said end wall.

7. The invention according to claim 2 wherein said voltage is varied to drive said diaphragm with a pulsating effect to form discrete fluid drops in the fluid stream exiting said nozzle.

8. The invention according to claim 2 wherein said voltage is varied to drive said diaphragm at its resonant frequency.

9. An inkjet printer head comprising a pair of spaced capacitor plates, one of which is a thin silicon diaphragm, responsive to a time varying voltage causing a varying electric field between said plates to set said diaphragm into mechanical motion, and reservoir means containing ink contiguous said diaphragm and including a nozzle through which ink exits responsive to said diaphragm motion, said reservoir being on the side of said diaphragm opposite said other capacitor plate, said reservoir being formed in a silicon substrate by a groove or cavity etched thereinto to provide said reservoir between side walls of silicon extending integrally from said diaphragm.

10. The invention according to claim 9 wherein said voltage is varied to drive said diaphragm with a pulsating effect to form discrete ink drops in the ink stream exiting said nozzle.

11. The invention according to claim 10 wherein said voltage is varied to drive said diaphragm at its resonant frequency.

12. The invention according to claim 9 comprising an end wall facing and spaced from said diaphragm and engaging the ends of said side walls to close said cavity, said end wall having an ink source entry port therethrough.

13. The invention according to claim 12 wherein said nozzle comprises a passage along the interface of said side wall and said end wall.

* * * * *